United States Patent [19]

Takahashi

[11] Patent Number: 4,896,589
[45] Date of Patent: Jan. 30, 1990

[54] AIR CONDITIONING CONTROL SYSTEM FOR AUTOMOTIVE VEHICLES

[75] Inventor: Tadahiro Takahashi, Konan, Japan

[73] Assignee: Diesel Kiki Co., Ltd., Tokyo, Japan

[21] Appl. No.: 353,545

[22] Filed: May 18, 1989

[30] Foreign Application Priority Data

Jun. 8, 1988 [JP] Japan ................................. 63-140944

[51] Int. Cl.$^4$ ............................................... B60H 1/00
[52] U.S. Cl. ................................... 98/2.01; 62/176.6; 236/44 A
[58] Field of Search ................................ 98/2.09, 2.01; 62/176.6; 236/44 C, 44 A, 44 R, 78 D; 165/21

[56] References Cited

U.S. PATENT DOCUMENTS 4,424,933 1/1984 Sutoh et al. ........................ 165/21 X
4,787,554 11/1988 Bartels et al. ...................... 236/78 D

FOREIGN PATENT DOCUMENTS 0158117 9/1982 Japan ..................................... 98/2.09
0083830 4/1986 Japan ..................................... 62/176.6

Primary Examiner—William E. Wayner
Attorney, Agent, or Firm—Charles S. McGuire

[57] ABSTRACT

An air conditioning control system for an automotive vehicle equipped with windowpanes has a humidity sensor for sensing humidity on the inner surface of a windowpane, and a temperature sensor for sensing temperature of the inner surface of the windowpane. When the sensed humidity on the inner surface is higher than a first predetermined value corresponding to the sensed temperature of the inner surface, the inner surface is determined to be in a state immediately before a mist occurs, and demisting control is executed. A second predetermined value lower than the first predetermined value by a predetermined amount is determined after the start of the demisting control. When the sensed latest value of the humidity on the inner surface becomes lower than the second predetermined value, it is determined that the mist has been cleared away, and the demisting conrol is stopped. The second predetermined value is determined based upon the sensed latest value of the temperature of the inner surface, and is set to a higher value as the sensed latest value of the temperature is higher insofar as the sensed latest value of the temperature is lower than a predetermined value. The first and second predetermined values may alternatively be determined based upon the difference between temperature within the vehicle compartment and the temperature of the windowpane inner surface.

5 Claims, 7 Drawing Sheets

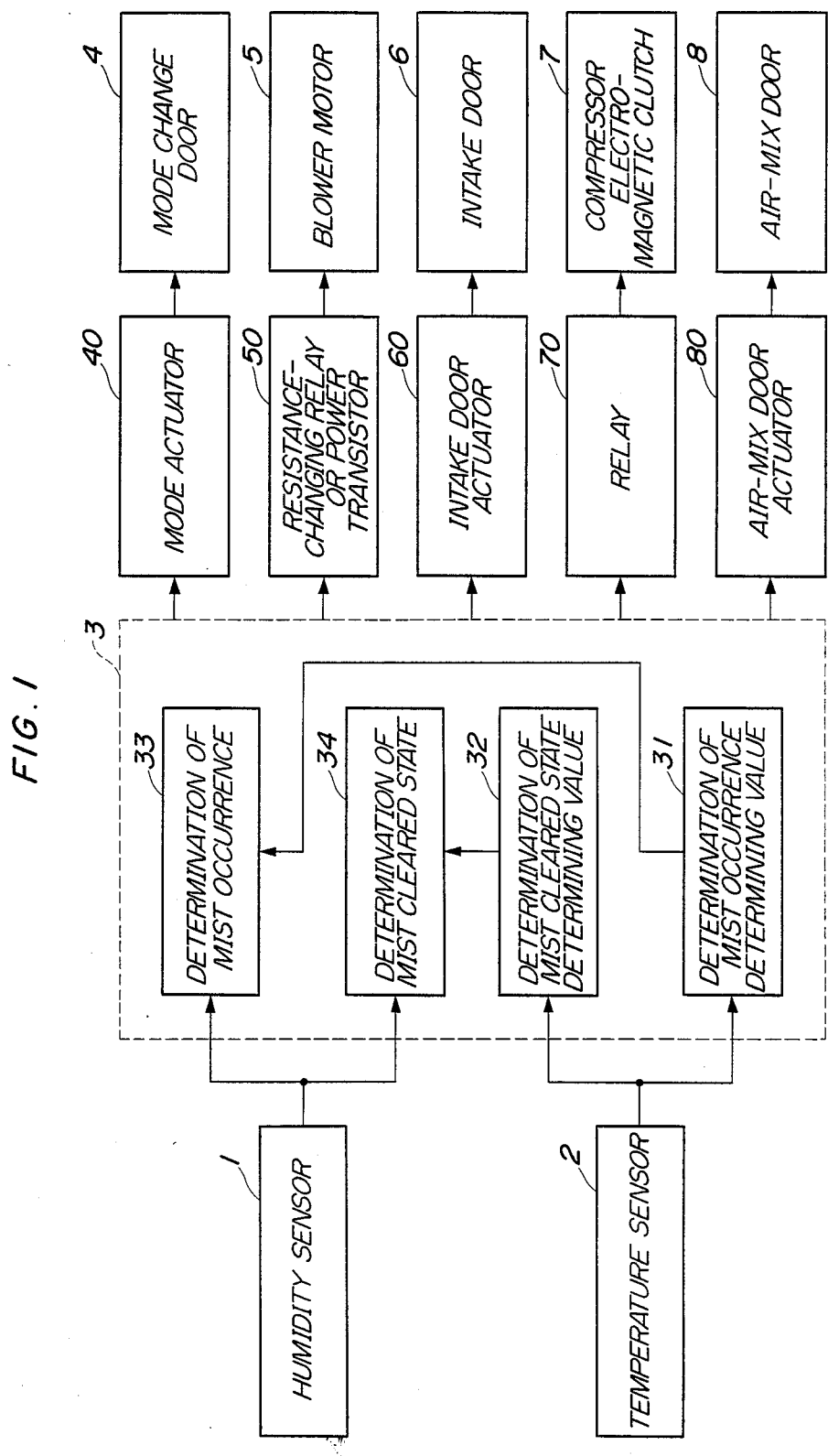
FIG. I

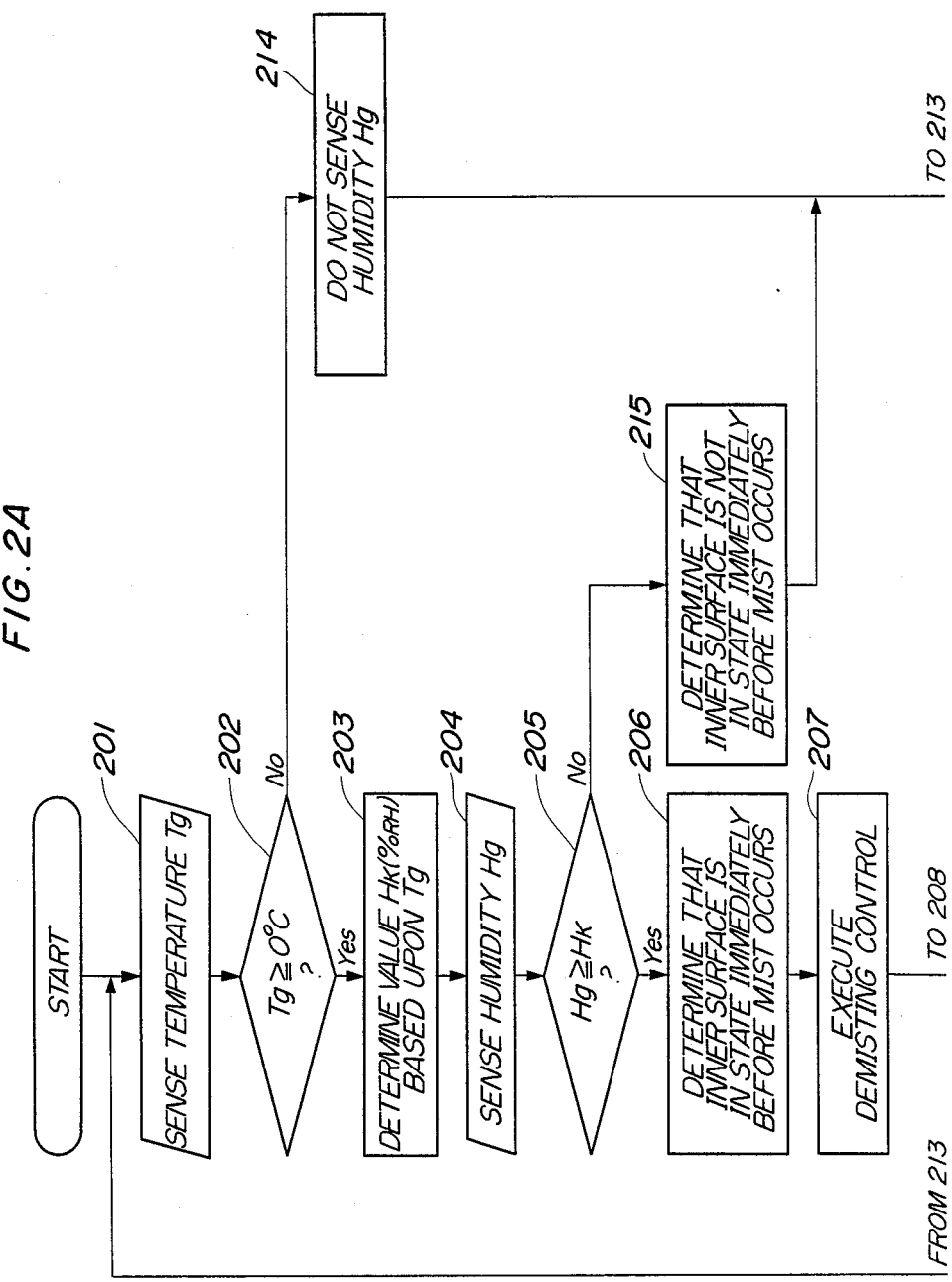

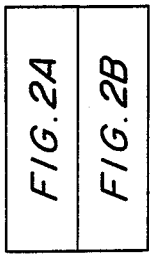
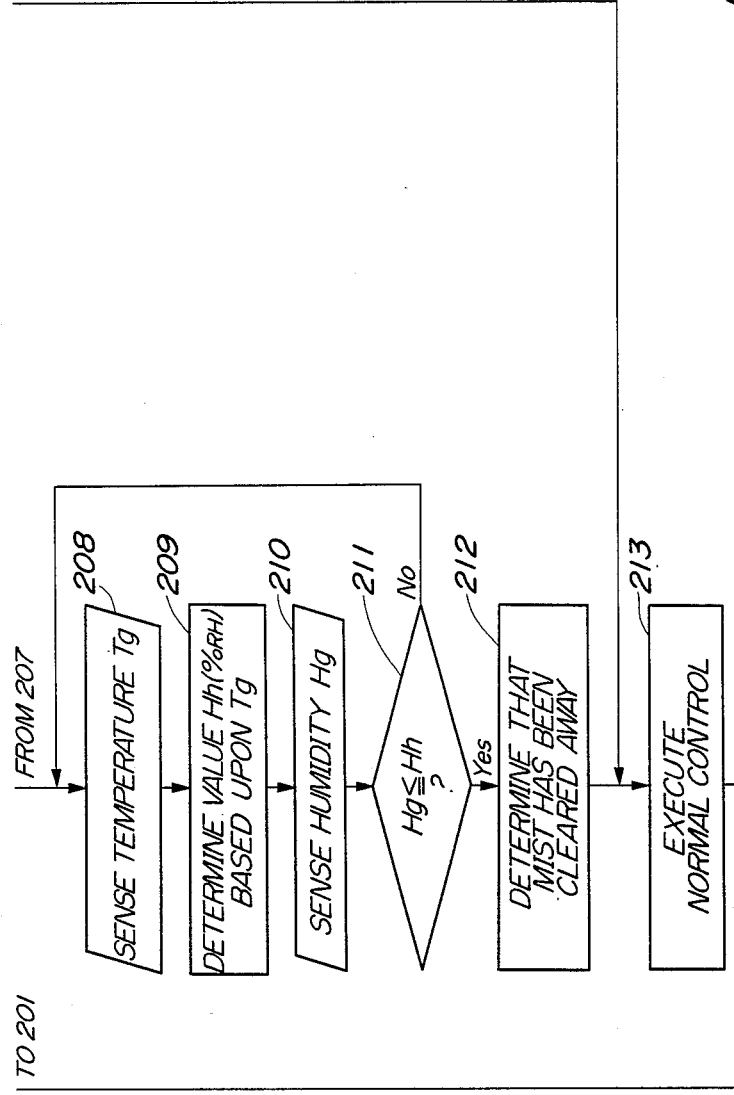

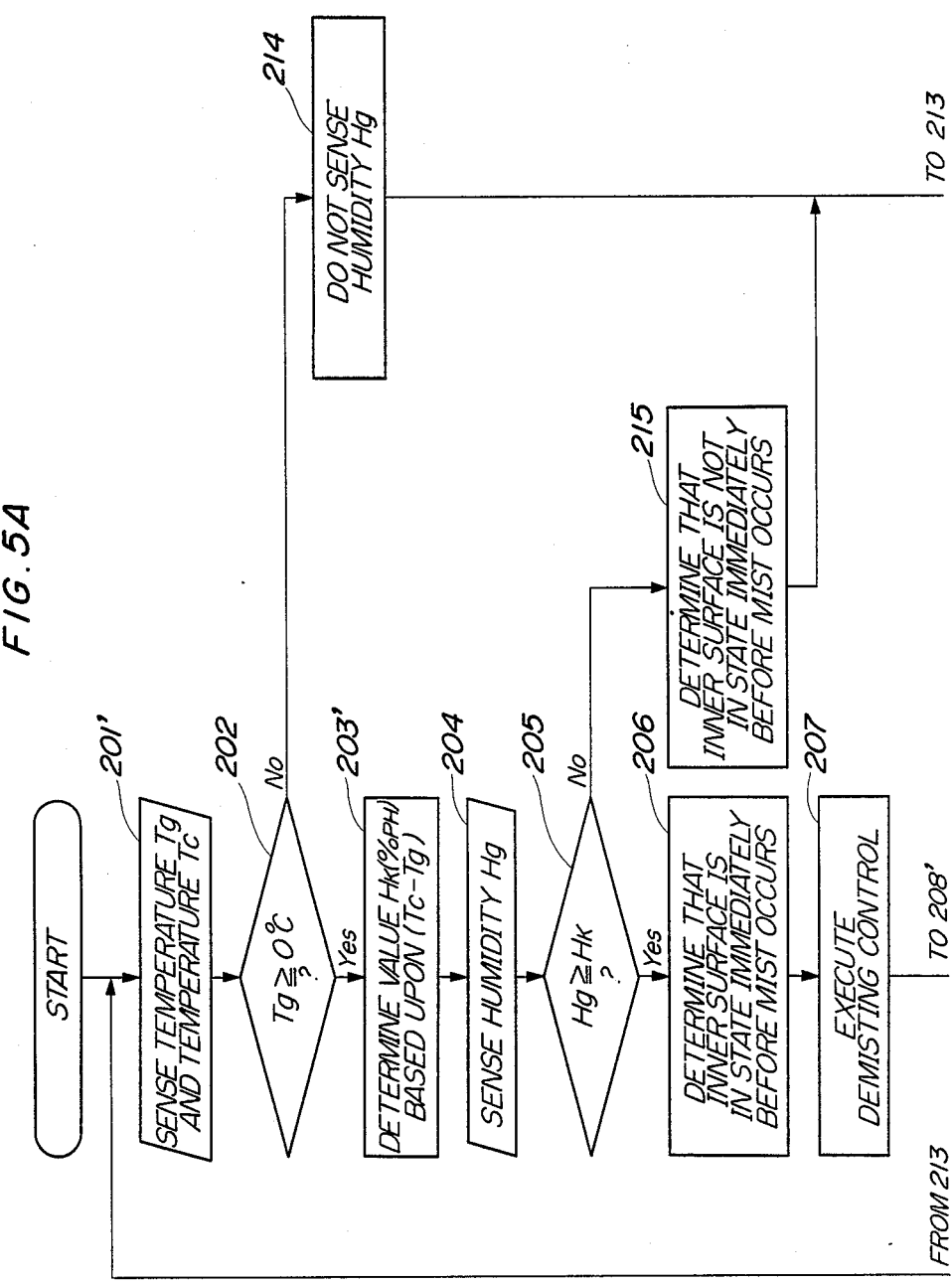

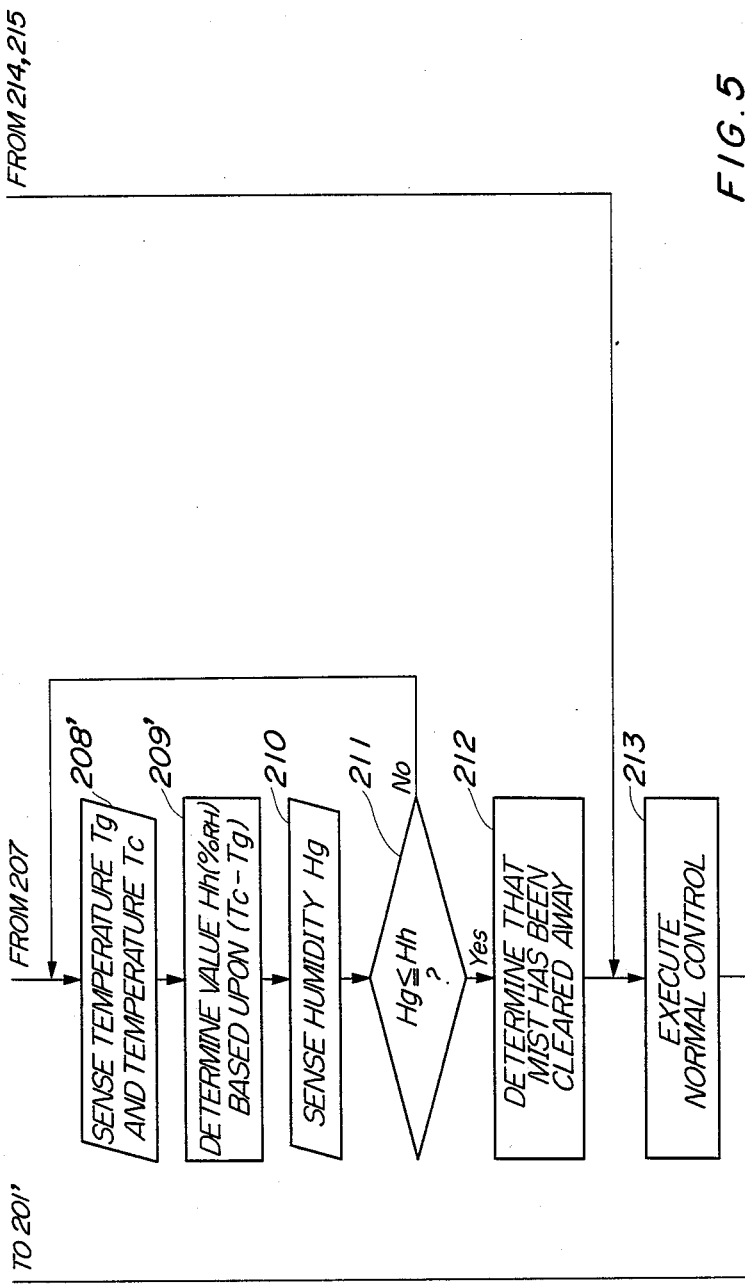

AIR CONDITIONING CONTROL SYSTEM FOR AUTOMOTIVE VEHICLES

BACKGROUND OF THE INVENTION

This invention relates to an air conditioning control system for automotive vehicles, which has a function of automatic demisting control responsive to humidity on the inner surface of a windowpane of a vehicle compartment.

an air conditioning control system of this type has been proposed by Japanese Provisional Patent Publication (Kokai) No. 63-25158, in which an actual value of humidity on the inner surface of a windowpane of a vehicle compartment is compared with a predetermined value which is assumed when the inner surface of the windowpane is in a state immediately before a mist occurs thereon, the temperature of the inner surface of the windowpane is sensed, and the predetermined value is varied depending upon the sensed temperature, thereby enabling to detect the state immediately before a mist occurs even when the temperature of the inner surface of the windowpane is below 0° C.

However, according to the above proposed conventional control system demisting control is started when it is determined that the sensed actual humidity on the inner surface of the windowpane becomes higher than the predetermined value, while the demisting control is stopped when it is determined that the sensed actual humidity becomes lower than the predetermined value. Therefore, there can occur hunting or frequent alternate starting and stopping of the demisting control, which can cause failure in the air conditioning system to be controlled, such as seizure between clutch plates of an electromagnetic clutch of a compressor of the air conditioning system. Further, humidity sensors employed have variations in characteristics due to machining tolerances, which adversely affects the accuracy of the demisting control.

SUMMARY OF THE INVENTION

It is an object of the invention to provide an air conditioning control system, which is free from hunting or frequent alternate starting and stopping of the demisting control to thereby avoid failure in the air conditioning system.

It is a further object of the invention to ensure sufficient accuracy of the demisting control irrespective of variations in the characteristics between humidity sensors employed.

It is another object of the invention to prevent the demisting control from being executed to an excessive extent to avoid an excessive increase in the temperature within the vehicle compartment and hence perform comfortable air conditioning.

According to a first aspect of the invention, there is provided an air conditioning control system for an automotive vehicle equipped with windowpanes, the system having a humidity sensor for sensing humidity on an inner surface of at least one of the windowpanes, a temperature sensor for sensing temperature of the inner surface of the at least one of the windowpanes, and demisting control means for determining that the inner surface of the least one of the windowpanes is in a state immediately before a mist occurs, and effecting demisting control for demisting the inner surface of the at least one of the windowpanes when the sensed humidity thereon is higher than a first predetermined value corresponding to the sensed temperature of the inner surface of the at least one of the windowpanes, the first predetermined value being assumed when the inner surface of the at least one of the windowpanes is in the state.

The air conditioning control system according to the first aspect is characterized by an improvement wherein:

the demisting control means comprises first determining means for determining a second predetermined value lower than the first predetermined value by a predetermined amount after the start of the demisting control, and second determining means for determining that the mist has been cleared away, and stopping the demisting control when the sensed latest value of the humidity on the inner surface of the at least one of the windowpanes becomes lower than the second predetermined value determined by the first determining means.

Preferably, the second predetermined value is determined based upon the sensed latest value of the temperature of the inner surface of the at least one of the windowpanes.

More preferably, the second predetermined value is set to a higher value as the sensed latest value of the temperature of the inner surface of the at least one of the windowpanes is higher insofar as the sensed latest value of the temperature is lower than a predetermined value.

According to a second aspect of the invention there is provided an air conditioning control system for an automotive vehicle equipped with windowpanes and a compartment, the system comprising:

a humidity sensor for sensing humidity on an inner surface of at least one of the windowpanes;

a first temperature sensor for sensing temperature within the compartment;

a second temperature sensor for sensing temperature of the inner surface of the at least one of the windowpanes, and demisting control means for determining that the inner surface of the at least one of the windowpanes is in a state immediately before a mist occurs, and effecting demisting control for demisting the inner surface of the at least one of the windowpanes when the sensed humidity thereon is higher than a first predetermined value corresponding to a difference between the sensed temperature within the compartment and the sensed temperature of the inner surface of the at least one of the windowpanes, the first predetermined value being assumed when the inner surface of the at least one of the windowpanes is in the state;

wherein the demisting control means comprises first determining means for determining a second predetermined value lower than the first predetermined value by a predetermined amount after the start of the demisting control, and second determining means for determining that the mist has been cleared away, and stopping the demisting control when the sensed latest value of the humidity on the inner surface of the at least one of the windowpanes becomes lower than the second predetermined value determined by the first determining means.

Preferably, the first and second predetermined values of the second aspect of the invention are set to and held at respective high constant values insofar as the difference between the temperature within the compartment and the temperature of the inner surface of the at least one of the windowpanes is smaller than a predetermined value, and set to respective smaller values as the difference is larger insofar as the difference is larger than the predetermined value.

The above and other objects, features, and advantages of the invention will be more apparent from the ensuing detailed description taken in conjunction with the accompanying drawings.

BRIEF DESCRIPTION OF THE DRAWINGS

FIG. 1 is a block diagram showing an air conditioning control system according to a first embodiment of the invention;

FIGS. 2 2A and 2B are flowcharts showing a manner of executing the demisting control;

FIGS. 5 5A and 5B are flowcharts similar to FIGS. 2, 2A and 2B according to the second embodiment of the invention.

DETAILED DESCRIPTION

Figure 3:
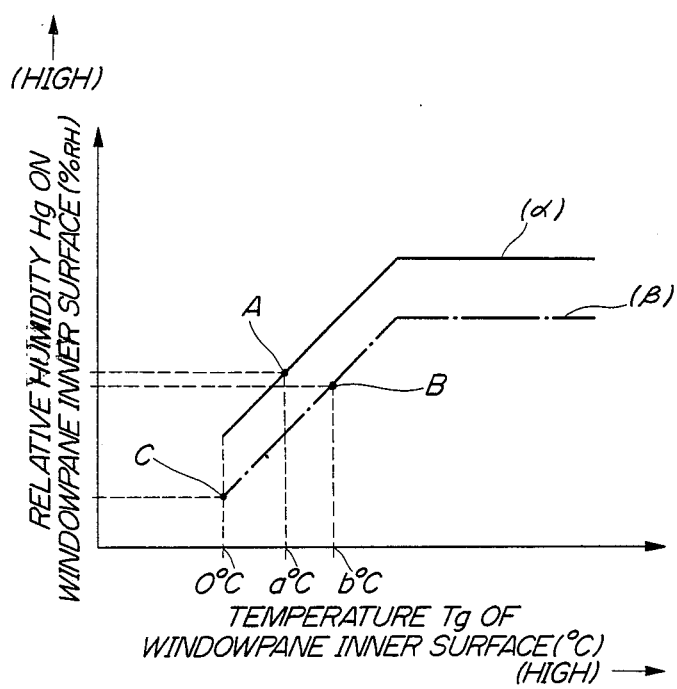
FIG. 3 is a graph showing a predetermined value of humidity for determining occurrence of mist and a predetermined value of humidity for determining a mist-cleared state, plotted with respect to relative humidity on the windowpane inner surface and temperature thereof, according to the first embodiment of the invention.

The invention will now be described in detail with reference to the drawings showing embodiments thereof.

Referring first to FIG. 1, there is illustrated an air conditioning control system according to a first embodiment of the invention. The air conditioning control system comprises a humidity sensor 1 for sensing humidity (relative humidity) Hg on the inner surface of a windowpane of a vehicle, a temperature sensor 2 for sensing temperature Tg of the inner surface of the windowpane, and demisting control means 3 for controlling the operation of air conditioning devices of the air conditioning control system so as to remove a mist on the inner surface of the windowpane. The demisting control means 3 supplies respective control signals to a mode actuator 40, a resistance-changing relay or a power transistor 50, an intake door actuator 60, a relay 70, and an air-mix door actuator 80 to respectively drive such air conditioning devices as an air outlet-selecting door or mode change door 4, a blower motor 5, an intake door 6, an electromagnetic clutch 7 of a compressor, not shown, and an air-mix door 8.

Demisting control includes various kinds of control such as control of changing the mode change door 4 from FOOT mode to DEF/FOOT mode or from DEF/FOOT mode to DEF mode, control of increasing the rotational speed of the blower motor 5, control of changing the intake door 6 from recirculated air-circulating mode to fresh air-introducing mode, control of energizing the electromagnetic clutch 7 of the compressor, and control of displacing the air-mix door 8 to a position in which hot air is discharged at a higher rate. These kinds of control are respectively carried out singly or in combination.

The demisting control means 3 comprises a section 31 for determining a predetermined value of humidity used to determine mist occurrence, a section 32 for determining a predetermined value of humidity used to determine a mist-cleared state, a section 33 for determining mist occurrence, and a section 34 for determining the mist-cleared state.

The section 31 determines the predetermined value Hk of the relative humidity on the inner surface of the windowpane as a reference value above which the demisting control is to be started, as indicated by the solid line $\alpha$ in FIG. 3. The predetermined value Hk corresponds to a value of the relative humidity on the inner surface of the windowpane which is in a state immediately before a mist occurs thereon. More specifically, the section 31 determines the value Hk such that the value Hk is increased as the value of the temperature Tg of the inner surface of the windowpane supplied from the temperature sensor 2 is higher, in a lower temperature region where the ambient temperature is so low that the temperature Tg is below a predetermined value, e.g. 10° C., while the value Hk is maintained at a constant value irrespective of the temperature Tg in a higher temperature region where the ambient temperature is so high that the temperature Tg is above the predetermined value.

The section 32 determines a mist-cleared state determining value Hh, i.e. a predetermined value Hh of the relative humidity on the inner surface of the windowpane, as a reference value below which the demisting control is to be stopped. More specifically, the section 32 determines the value Hh as indicated by the one-dot chain line $\beta$ in FIG. 3, that is, such that the value Hh is lower than the mist occurrence determining value Hk by a predetermined value and is increased as the temperature Tg increases in the lower temperature region, while it is maintained, in the higher temperature region, at a constant value lower than the value Hk by the predetermined value irrespective of the temperature Tg.

The section 33 compares the actual value of the relative humidity Hg on the inner surface of the windowpane supplied from the humidity sensor 1 with the predetermined value Hk supplied from the section 31, and determines that the inner surface of the windowpane is in a state immediately before a mist occurs thereon if Hg≧Hk holds, while determining that it is not in the state if Hg<Hk holds. If the inner surface of the windowpanes is determined to be in the state immediately before a mist occurs thereon, the demisting control means 3 effects the demisting control, whereas if it is determined that the inner surface is not in the state, the control means 3 effects normal control in which the mode change door 4, the blower motor 5, the intake door 6, the electromagnetic clutch 7 of the compressor, and the air-mix door 8 are respectively controlled depending upon the thermal load on the air conditioning system.

After the start of the demisting control, the section 34 for determining the mist-cleared state compares the latest value of the relative humidity Hg on the inner surface of the windowpane supplied from the humidity sensor 1 with the latest mist-cleared state determining value Hh supplied from the section 32 for determining the mist-cleared state-determining value Hh, and determines that the mist has been cleared away from the inner surface of the windowpane if Hg≦Hh holds. The demisting control means 3 continues the demisting control until the mist-cleared state-determining section 34 determines that the mist has been cleared away, and stops the demisting control and effects the normal control when it is determined that the mist has been cleared away.

The operation of the first embodiment will now be described with reference to the flowchart of FIG. 2.

First at a step 201 in FIG. 2, the demisting control means 3 reads the actual temperature Tg of the inner surface of the windowpane supplied from the temperature sensor 2. At the next step 202 it is determined whether or not Tg≧0° C. holds. If the answer is No, that is, if Tg<0° C., the relative humidity sensor 1 cannot sense relative humidity, so that detection of relative humidity is not carried out at a step 214, followed by the program proceeding to a step 213 where the normal control is effected.

On the other hand, if the answer at the step 202 is Yes, that is, if Tg≧0° C., the section 31 for determining the mist occurrence-determining value Hk determines, at a step 203, the predetermined value Hk in accordance with the detected temperature Tg. At a step 204, the mist occurrence-determining section 33 reads the actual relative humidity Hg on the inner surface of the windowpane from the humidity sensor 1, and then determines at a step 205 whether or not Hg≧Hk holds. If the answer at the step 205 is No, that is, if Hg<Hk, it is determined at a step 215 that no mist will occur, followed by the program proceeding to the step 213 where the normal control is effected.

If the answer at the step 205 is Yes, that is, if Hg≧Hk, the mist occurrence-determining section 33 determines at a step 206 that a mist will occur, followed by the program proceeding to a step 207 where the demisting control is started.

After the start of the demisting control, the the value Hh-determining section 32 reads, at a step 208, the latest temperature Tg of the inner surface of the windowpane from the temperature sensor 2, and determines, at a step 209, the predetermined value Hh in accordance with the detected latest temperature Tg. At the next step 210, the mist-cleared statedetermining section 34 reads the latest relative humidity Hg on the inner surface of the windowpane supplied from the humidity sensor 1, and determines, at a step 211, whether or not Hg≦Hh holds.

If the answer at the step 211 is No, that is, if Hg>Hh, the program proceeds to the step 208 where the demisting control is continued. If the answer at the step 211 is Yes, that is, if Hg≦Hh, the mist-cleared state-determining section 34 determines at a step 212 that the mist has been cleared away, followed by the demisting control device 3 changing the demisting control over to the normal control at the step 213.

The above operation will now be described more in detail with reference to FIG. 3.

When the temperature Tg of the inner surface of the windowpane sensed by the temperature sensor 2 is aoC, the mist occurrence-determining value Hk is A at this temperature. If the relative humidity Hg on the inner surface of the windowpane sensed by the humidity sensor 1 exceeds the mist occurrence-determining value A at such a low temperature as a° C., the mist occurrence-determining section 33 determines that a mist has occurred, whereby the demisting control device 3 starts the demisting control. In accordance with the start of the demisting control, the discharge amount of warm air through a defrosting air outlet, not shown, is increased to warm the inner surface of the windowpane. If the temperature Tg of the inner surface of the windowpane increases from a° C. to b° C. after the start of the demisting control, the latest mist-cleared state-determining value Hh corresponding to the latest temperature b° C. becomes B. The demisting control is stopped when the latest relative humidity Hg on the inner surface of the windowpane is below the latest mist-cleared state-determining value B.

As described above, according to the invention, while the demisting control is effected at a low temperature, the mist-cleared state-determining value Hh is increased with an increase in the temperature Tg of the inner surface of the windowpane. This arrangement provides the following advantages:

(1) If the temperature Tg increases, the demisting control should be stopped even when the relative humidity Hg holds the same value or does not much lower. However, on such an occasion, if the mistcleared state-determining value Hh is maintained at a constant value, the demisting control is continued, resulting in an excessive increase in the temperature within the vehicle compartment to fail to perform comfortable air conditioning. This disadvantage can be avoided by increasing the mist-cleared state-determining value Hh in accordance with an increase in the temperature Tg.

(2) Even when the relative humidity Hg is lower than a value C which is the lowest value that the humidity sensor 1 can sense, the mist-cleared state-determination can be made by increasing the mist-cleared state-determining value Hh in accordance with an increase in the temperature Tg.

Figure 4:
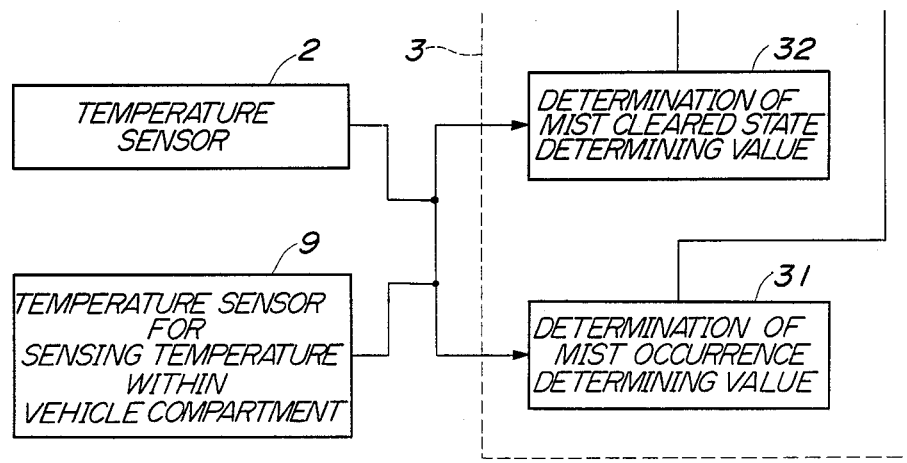
FIG. 4 is a block diagram similar to FIG. 1, according to a second embodiment of the invention.

A second embodiment of the invention will now be described with reference to FIGS. 4-6. The second embodiment of FIG. 4 is identical in construction to the above described first embodiment of FIG. 1 except that a temperature sensor 9 for sensing the temperature within the vehicle compartment is added. Therefore, identical or similar elements to those in FIG. 1, which are omitted in FIG. 4, may be used in the second embodiment, and description thereof is also omitted. Also a prepram shown in FIG. 5 is identical to that of FIG. 2 except for steps 201', 203', 208' and 209', the other steps corresponding to those in FIG. 2 are designated by identical reference numerals, and description thereof is omitted.

Figure 6:
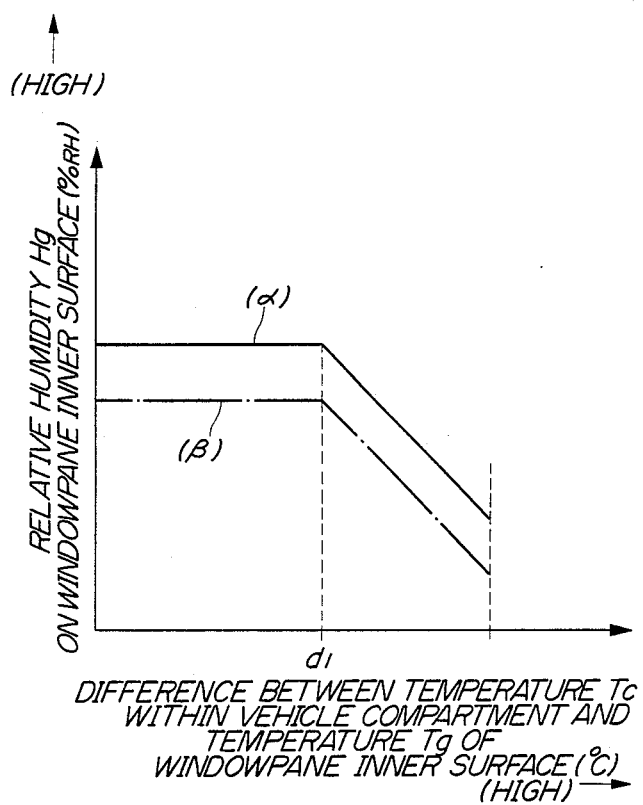
FIG. 6 is a graph similar to FIG. 3, according to the second embodiment of the invention.

The air conditioning control system for vehicles according to the second embodiment is constructed such that temperature Tc within the vehicle compartment and the temperature Tg of the inner surface of the windowpane are sensed by the temperature sensor 9 and the temperature sensor 2, respectively, at steps 201' and 208', and the mist occurrence-determining value Hk and the mist-cleared state-determining value Hh are determined in accordance with the difference (Tc - Tg) at steps 203' and 209' in such a manner that the values Hk and Hh are varied as indicated by the solid line 91) and the one-dot chain line (b) in FIG. 6, respectively.

Specifically, in a region in which the difference between the temperature Tc within the vehicle compartment and the temperature Tg of the inner surface of the windowpane is smaller than a predetermined value d1, a mist is not liable to occur on the inner surface of the windowpane, so that the mist occurrence-determining value Hk and the mist-cleared state-determining value Hh are set to and held at respective predetermined high constant values, whereas in a region in which the difference is larger than the predetermined value d1, the mist occurrence-determining value Hk and the mist-cleared state-determining value Hh are decreased as the difference increases.

According to the second embodiment, since the mist occurrence-determining value Hk and the mist-cleared state-determining value Hh are determined depending upon the difference between the temperature Tc within the vehicle compartment and the temperature Tg of the inner surface of the windowpane, more accurate demisting control can be effected as compared with the first embodiment.

As described above, according to the invention, the demisting control is continued even after the inner surface of the windowpane leanes the state immediately before a mist occurs thereon and until the relative humidity Hg thereon lowers to the mist-cleared state-determining value Hh. Therefore, hunting or frequent alternate starting and stopping of the demisting control can be avoided to thereby prevent failure in the air conditioning system and prevent degraded accuracy of the demisting control caused by variations in characteristics between humidity sensors employed.

Further, the mist-cleared state-determining value Hh is varied in accordance with the temperature Tg of the inner surface of the windowpane or the difference between the compartment temperature Tc and the windowpane temperature Tg, and at the same time it is determined that mist has been cleared away when the latest value of the relative humidity Hg on the inner surface of the windowpane is lower than the latest mist-cleared state-determining value Hh, so that the demisting control is prevented from being effected to an excessive extent, thereby avoiding an excessive increase in the temperature within the vehicle compartment to enable performing comfortable air conditioning.

What is claimed is:

1. In an air conditioning control system for an automotive vehicle equipped with windowpanes, the system having a humidity sensor for sensing humidity on an inner surface of at least one of said windowpanes, a temperature sensor for sensing temperature of the inner surface of said at least one of said windowpanes, and demisting control means for determining that the inner surface of said least one of said windowpanes is in a state immediately before a mist occurs, and effecting demisting control for demisting the inner surface of said at least one of said windowpanes when the sensed humidity thereon is higher than a first predetermined value corresponding to the sensed temperature of the inner surface of said at least one of said windowpanes, said first predetermined value being assumed when the inner surface of said at least one of said windowpanes is in said state, the improvement wherein:
said demisting control means comprises first determining means for determining a second predetermined value lower than said first predetermined value by a predetermined amount after the start of said demisting control, and second determining means for determining that said mist has been cleared away, and stopping said demisting control when the sensed latest value of the humidity on the inner surface of said at least one of said windowpanes becomes lower than said second predetermined value determined by said first determining means.

2. An air conditioning control system as claimed in claim 1, wherein said second predetermined value is determined based upon the sensed latest value of the temperature of the inner surface of said at least one of said windowpanes.

3. An air conditioning control system as claimed in claim 2, wherein said second predetermined value is set to a higher value as the sensed latest value of the temperature of the inner surface of said at least one of said windowpanes is higher insofar as the sensed latest value of the temperature is lower than a predetermined value.

4. An air conditioning control system for an automotive vehicle equipped with windowpanes and a compartment, the system comprising:
a humidity sensor for sensing humidity on an inner surface of at least one of said windowpanes;
a first temperature sensor for sensing temperature within said compartment;
a second temperature sensor for sensing temperature of the inner surface of said at least one of said windowpanes,
and demisting control means for determining that the inner surface of said at least one of said windowpanes is in a state immediately before a mist occurs, and effecting demisting control for demisting the inner surface of said at least one of said windowpanes when the sensed humidity thereon is higher than a first predetermined value corresponding to a difference between the sensed temperature within said compartment and the sensed temperature of the inner surface of said at least one of said windowpanes, said first predetermined value being assumed when the inner surface of said at least one of said windowpanes is in said state;
wherein said demisting control means comprises first determining means for determining a second predetermined value lower than said first predetermined value by a predetermined amount after the start of said demisting control, and second determining means for determining that said mist has been cleared away, and stopping said demisting control when the sensed latest value of the humidity on the inner surface of said at least one of said windowpanes becomes lower than said second predetermined value determined by said first determining means.

5. An air conditioning control system as claimed in claim 4, wherein said first and second predetermined values are set to and held at respective high constant values insofar as the difference between the temperature within said compartment and the temperature of the inner surface of said at least one of said windowpanes is smaller than a predetermined value, and set to respective smaller values as the difference is larger insofar as the difference is larger than said predetermined value.

* * * * *